July 2, 1968
J. W. EERKENS
3,391,281
DIRECT NUCLEAR RADIATION EXCITED
PHOTON GENERATOR AND EMITTER
Filed Dec. 3, 1965
2 Sheets-Sheet 1
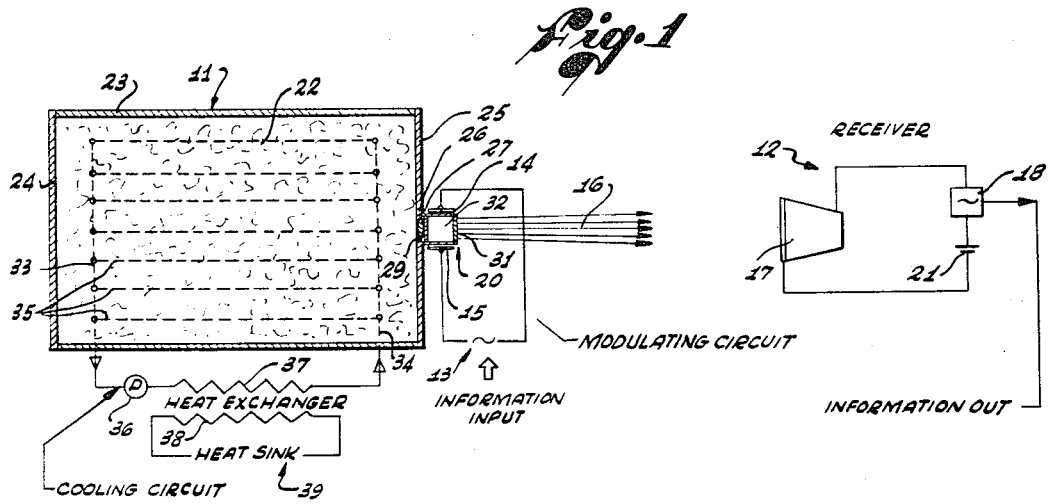
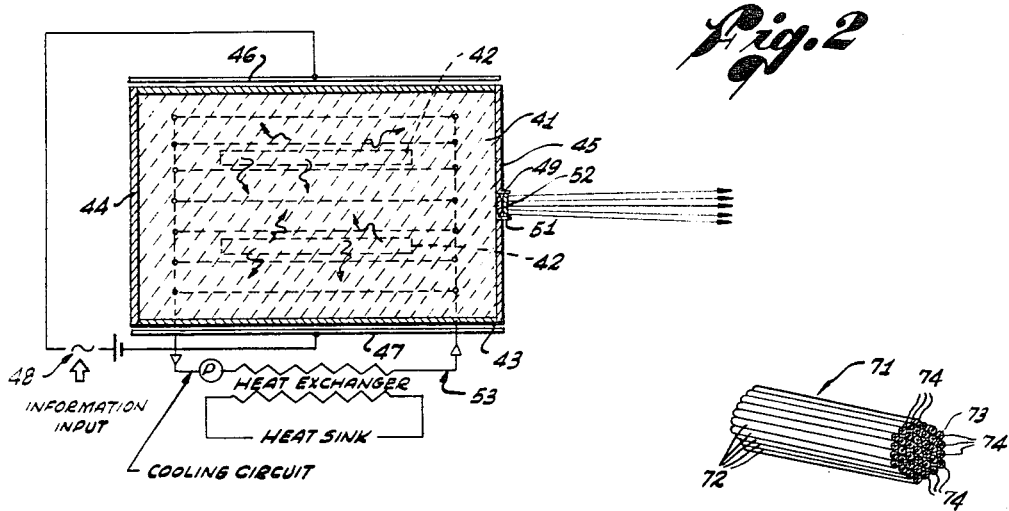
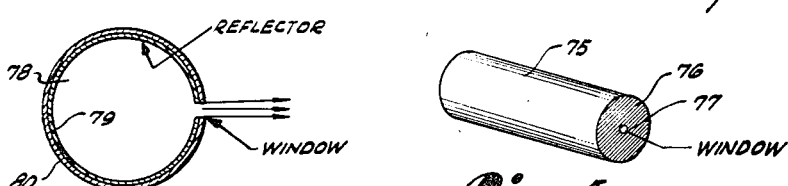
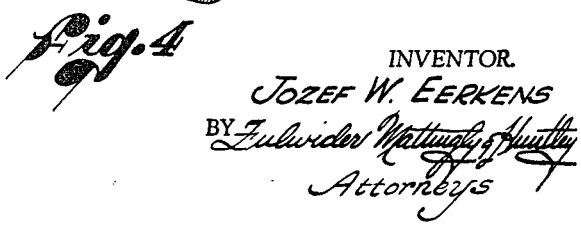
INVENTOR.
JOZEF W. EERKENS
BY
Attorneys July 2, 1968  J. W. EERKENS  3,391,281
DIRECT NUCLEAR RADIATION EXCITED
PHOTON GENERATOR AND EMITTER
Filed Dec. 3, 1965  2 Sheets-Sheet 2

INVENTOR.
JOZEF W. EERKENS
BY Fulwider, Patton, Rieber,
Lee, and Utecht
ATTORNEYS

3,391,281
DIRECT NUCLEAR RADIATION EXCITED PHOTON GENERATOR AND EMITTER

Jozef W. Eerkens, Gardena, Calif., assignor to Terra Nova, Incorporated, Los Angeles, Calif., a corporation of California
Continuation-in-part of application Ser. No. 198,853, May 31, 1962. This application Dec. 3, 1965, Ser. No. 518,509
20 Claims. (Cl. 250—199)

The present application is a continuation-in-part of my prior and copending application Ser. No. 198,853, filed May 31, 1962, for Radiation Induced Photon Emitter, now abandoned.

The present invention relates to a device for converting the energy from nuclear radiation directly into photons by means of a lasable or non-lasable luminescent medium excited by the radiation. The wavelengths of the photons will lie in general somewhere between 1 angstrom and 1 centimetre, depending on the type of luminescent medium used. The photons are emitted from the device in the form of a concentrated coherent or incoherent beam which can be used for any suitable purpose, such as welding, cutting, in weaponry and the like, where high energy outputs are desired, and the beam may be directly or subsequently modulated and used for communication or other purposes.

In the photon emitter of this invention, excitation of the luminescent material is preferably brought about by heavy particle nuclear radiation such as: fission fragments, alpha particles, protons, neutrons, beta particles, and other particulate or electromagnetic quanta emitted by the nucleus. Gamma rays from the nucleus may also be used but are not as desirable as the heavy particle radiation since the energy deposition density of gamma rays is lower and, particularly in the case of a gaseous medium, a much longer path is required for energy conversion thus making the conversion apparatus bulky and cumbersome. Thus, heavy particles come to rest within 0.01 to 0.1 cm. in solid or liquid materials while gamma rays may travel 10–100 cm. before they lose a significant portion of their energy. The excited luminescent material will emit photons of certain wavelengths while returning to its unexcited state. If enough nuclear radiation energy is supplied to the luminescent material, and if the luminescent medium possesses lasable states and is properly mirrored, laser action may be induced in the luminescent medium, yielding a coherent beam of photons. The process of exciting the luminescent medium to obtain laser action is often referred to as pumping. Non-lasing emitters of incoherent beams of photons are adequate in certain applications, but in others, longer ranges, higher intensities, and other advantages may be gained if a coherent beam of photons is employed.

Of the sources of nuclear radiation, preferred are those whose energy deposition density is high, so that a high density of excited states is generated. The sources used may be located outside of the luminescent medium or may be placed in concentrated form in pockets or fibers therein, or may be dispersed homogeneously through the luminescent medium. The luminescent medium used may be any material, gaseous, liquid or solid, which upon direct or indirect contact with the nuclear radiation is excited and emits photons upon de-excitation. The luminescent medium may be composed of pure luminescent material or it may be composed of a luminescent material and an auxiliary or host material. The latter may aid to channel the nuclear radiation energy that is deposited in the luminescent medium towards exciting the luminescent states of the luminescing atoms, ions or molecules. The auxiliary or host material must of course have the property that it be transparent to the photons which are generated by the luminescent material, so as to prevent reabsorption of these photons.

Excitation or pumping of the luminescent medium by the nuclear source may in certain applications take place in a different location from that where photon emission is allowed to take place, provided the pumped states have long-enough lifetimes. For example a lasable gas or mixture of gases may be circulated through the core of a critical nuclear chain reactor where fission fragments are produced, for example, from the fissioning of gaseous uranium hexafluoride which is mixed in with the laser gas, or from a thin coating of uranium or a uranium compound present on the walls of the tubes through which the laser gas passes. After being pumped by fission fragments in the core region, the laser gas is passed into a second cavity or tube which is mirrored so as to induce laser action in the pumped gas. This is possible if the pumped states have lifetimes exceeding the transit time for passing the gas from the core to the laser cavity. The advantage of this technique is that the laser mirrors will be less exposed to radiation, and the laser cavity geometry is not constrained by the nuclear core geometry. Circulation of the laser gas is required anyway for cooling and purification purposes in many applications, and thus gas circulation from a separate pump region to a laser region should not add any complications. Uranium hexafluoride by itself may be lased in the manner described above, since this gas possesses lasable inversions as well as a built-in source of nuclear energy.

An example of a suitable fission fragment source and a non-circulating laser gas is a tubular canister containing a coating of uranium 233 or 235 or plutonium 239 on its inside walls and filled with helium, neon, argon, xenon, krypton, oxygen, nitrogen, nitrogen dioxide, carbon dioxide or mixtures thereof. Reflecting mirrors or other optical resonator systems are placed in the canister with a partially transparent laser mirror at an end of the canister to allow laser radiation to exit from the canister. By placing the canister in a nuclear reactor, its uranium becomes an integral part of the critical mass of the reactor and participates in the reactor's controlled chain reaction. Fissioning of the uranium in the canister will then pump the laser gas present in it. An entire critical assembly of uranium-fueled laser canisters may be employed, or only a portion of a reactor core may be occupied by one or more of such laser tubes, depending on the application. The photon emission may be continuous or in pulses, and the latter action can be regulated by movement of the reactor control rods to change the critical mass of the reactor core.

An example of an alpha-emitting radioisotope source and a laser gas system is a tube filled with helium, neon, argon, krypton, xenon, oxygen, nitrogen, nitrogen dioxide, carbon dioxide or mixtures thereof, and coated on its inside walls with polonium-210, or, in lieu of the coating, the above gases can have radon-222 gas mixed therein. Pure radon-222 can lase by itself. Appropriate optical resonator mirrors or reflectors are added at the ends of the tube to induce lasing action.

An example of a beta-emitting radioisotope source and a laser gas system is a tube coated on the inside walls with cerium-144, cesium-137 or strontium-90 and filled with one or more of the lasing gases listed above, or instead of a surface coating, krypton-85 may be mixed in the gas as a volumetric source of betas. Pure krypton-85 may also lase all by itself.

An example of a liquid luminescor-radioisotope is a solution of radioactive polonium chloride, $PoCl_3$, dissolved in boron chloride, $BCl_3$, to which a small amount of neodymium or uranium chrolide is added as the luminescent material. Where a gamma ray source is permissible, the $BCl_3$ ($NdCl_3$) may be present in ducts or passages in a block of cobalt-60.

Also where a gamma ray source is permissible, an example of a solid luminescent medium which may be used with such a source placed outside the liquid luminescent material or embedded in pockets or fibers there is neodymium- or uranium-activated calcium fluoride, $CaF_2(Nd)$ or $CaF_2(U)$. A relatively low-cost gamma radioisotope source that might be employed with the above luminescent media is cobalt-60. In certain situations, it might be advantageous to have laser action take place outside the gamma radiation field. By placing a number of lasable luminescent rods on a circle in the same fashion as the revolving cartridge chamber on a revolver and by turning them rapidly in and out of a gamma irradiation region into a region with laser mirrors, certain solid luminescent laser rods with long pump lives may be operated to lase outside of the radiation field. In most cases, however, the use of heavy particle nuclear radiation is preferred to gamma rays from the nucleus, as previously described.

An example of a solid semiconductor luminescent medium pumped by nuclear radiation is a sandwich of alternate thin layers of semiconductor and nuclear material. Gallium arsenide, indium phosphide, indium arsenide, indium antimonide, and lead telluride, could, for example, be used as semiconductor materials, and uranium-235, polonium-210, cerium-144, and the like, as the nuclear source.

Where the photon beam is emphasized for communication, the term is used in its broadest sense to include the transmission of intelligence generally. In such cases, modulation may be effected in any desired manner, for example, by variation of an electrostatic field between plates applied to the luminescent medium itself or to an electrooptic material through which the beam passes, by variation of an electro-magnetic field, or by a mechanical opaque "chopper."

It is therefore an object of the present invention to provide an improved high intensity photon generator and emitter.

Another object of this invention is the provision of an improved photon generator and emitter employing a luminescent medium having centers which are directly excited by nuclear radiation and emit photons on deexcitation.

Another object of this invention is the provision of an improved photon generator and emitter which converts nuclear radiation directly into photons by means of a luminescent medium which emits the photons in the form of a concentrated coherent or incoherent beam.

A further object of this invention is the provision of an improved photon generator and emitter employing a luminescent medium which is excited by heavy particle nuclear radiation to produce a high energy photon beam.

A still further object of this invention is the provision of an improved laser device in which a lasable medium is pumped by nuclear radiation to produce lasing action and the emission of a coherent beam of photons from the laser.

Yet another object of this invention is the provision of an improved photon beam transmitter for communication in which a luminescent medium is excited by direct nuclear radiation to emit a photon beam which is directly or subsequently modulated to transmit intelligence generally.

Still another object of this invention is the provision of an improved laser device in which a lasing medium of liquid, gaseous, or solid form is directly excited by heavy particle nuclear radiation to induce lasing action and the emission of a coherent beam of photon for laser beam use generally.

These and other objects and features of the invention will be readily apparent to those skilled in the art from the following specification and the appended drawing of presently preferred embodiments of the invention in which:

FIGURE 1 is a schematic representation of its communication system including a transmitter and a receiver employing a modulated photon beam in which the transmitter includes a nuclear radiation excited photon emitter according to the present invention;

FIGURE 2 is a schematic representation of a modulated transmitter using a different form of modulation and a different arrangement for the nuclear radiation excitation of the photon emitter;

FIGURE 3 is a schematic perspective representation of another form of nuclear radiation excited photon generator and emitter according to the present invention;

FIGURE 4 is a schematic perspective representation of a cylindrical form of photon generator and emitter according to the present invention;

FIGURE 5 is a schematic sectional representation of a spherical form of a photon generator and emitter according to the present invention employing a luminescent medium;

Figure 6:
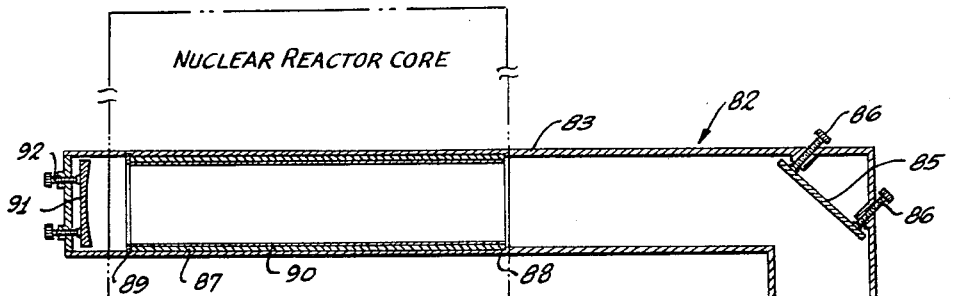
FIGURE 6 is a schematic sectional view showing a gas laser pumped by nuclear radiation according to the present invention.

Referring first to the modulated communication system of FIGURE 1, there is shown a transmitter 11 and a receiver 12. In the transmitter 11, information in the form of an electric signal is fed at 13 to a pair of condenser plates 14 and 15 forming part of a Kerr cell shutter 20 which modulates the photon beam 16 and produces information pulses. The modulated or pulsed photon beam 16 is received at the receiver 12 in a photo-multiplier tube 17 which transforms the modulated photon beam into corresponding electronic modulation fed to an output device 18. A direct current source 21 is in the photo-multiplier circuit of the receiver.

The luminescent medium, nuclear radiation source combination shown at 22 in FIGURE 1 is of the distributed type particularly adapted for heavy particle radiation, examples of which have been given heretofore and which may be of solid, liquid or gaseous materials. The luminescent medium and radiation source combination is preferably enclosed within a container 23 having reflecting end plates 24 and 25. The opposed surfaces of the plates 24 and 25 may be provided with polished reflecting surfaces or with coating of high reflecting power. The photon beam is emitted through the front plate 25 which, for this purpose, may be provided with a window 26 which can be simply a transparent nonreflecting portion thereof and in front of which is placed a collimating lens 27. Alternatively, the front plate 25 may be of transparent material with its entire inner surface, or any portion thereof as a window, coated with a partially transparent but mainly reflective coating such as shown and described in connection with FIGURES 6 and 7 hereafter.

It will be apparent that the photon beam 16 may be modulated to transmit information by pulse duration modulation, amplitude modulation, polarization modulation and frequency modulation. The photon emitter of FIGURE 1 showing pulse duration modulation through a Kerr cell 20 between crossed nicol prisms 29 and 31 in front of the lens 27 so that the photon beam will pass therethrough. The shutter material 32 of the Kerr cell may be fluid or solid and becomes birefringent in known manner upon application of an electric or magnetic field thereto. The planes of polarization of the nicol prisms are 45° inclined to the axis of the condenser formed by the plates 14, 15 and no photons will pass so long as a condenser formed thereby is not charged. When an electric field is applied between the plates 14, 15 there is a rotation of the plane of polarization and photons are transmitted by the second prism. When the field is off, the second nicol prism will not pass the perpendicularly polarized photon beam. Therefore, by impressing the information to be transmitted upon the plates 14 and 15 in the form of pulse duration signals, the beam of photons emerging from the Kerr cell and nicol prism combination will be pulse duration modulated.

Instead of turning an electric or magnetic field on and off to apply pulse duration modulation, the field may be amplitude modulated causing more or less photons to be properly polarized for passage through the second nicol prism. The intensity of the photon beam emerging from the Kerr cell will then be amplitude modulated accordingly.

As a considerable portion of the nuclear radiation is transformed into heat in the luminescent medium it is desirable to effect cooling thereof and such a cooling arrangement is schematically illustrated in FIGURE 1. A circulating cooling system is mounted within the luminescent medium and comprises headers 33 and 34 between which extend a plurality of transverse tubes 35 embedded in the photon generator 22. A cooling medium may be circulated through this cooling circuit, for example by a pump 36, and the circuit may include a heat exchange portion 37 in which the abstracted heat is transferred to a heat exchange portion 38 connecting with a heat sink or other heat dissipating means 39. Alternatively, if the photon generator is a fluid, it may be directly cycled through the heat exchanger 37.

In the nuclear radiation excited photon generator and emitter of FIGURE 2, the luminescent medium is shown as a solid crystal 41, of one of the examples previously given, having cavities therein in which are embedded sources of nuclear radiation 42 which may be either heavy particle sources or, if permissible in the particular installation, a source of gamma radiation, as previously noted. The luminescent crystal may be enclosed by a container 43 including end reflecting plates 44 and 45, the plate 45 being the same as the plate 25 previously described, and its alternative. Electrode plates 46 and 47 are placed at opposite sides of the photon generator and a photon beam modulating signal is fed thereto as at 48. The front plate 45, like the plate 25, may have a window therein, or all or any portion thereof may be partially provided with a transparent, mainly reflective coating. The photon beam passes through a collimating lens 51 in front of which is disposed a single nicol polarizing prism 52. The cooling circuit indicated generally at 53 may be the same as that described for FIGURE 1, with the heat extracting elements here embedding in the crystal comprising the solid luminescent material.

In modulating the emitted beam in FIGURE 2, an electrostatic or electromagnetic field is placed directly across the photon generating medium to preferentially polarize the photons therein in the direction of the field. The nicol prism or polarizing plate 52 is at 45° with respect to the applied field. A pulse duration modulated or amplutde modulated beam of photons will be transmitted through the nicol prism according to whether the field applied across the luminescent material generator is duration or amplitude modulated.

The photon generator and emitter 71 shown in FIGURE 3 is made up of a bundle of rods or fibers 72, which may be coated with a source of nuclear radiation and having their opposite ends made reflective as by special dielectric coatings 73 and with one of the common ends thereof provided with individual central windows 74. Again, the entire end of each rod or fiber may have a partially transparent, reflecting coating thereon through which the photon beam emerges. By having the fibers relatively thin, that is with diameters of only several wavelengths, they can accommodate only a few modes, and there will be less loss through their sides. Such an arrangement can also be easily cooled.

The photon generator and emitter of FIGURE 4 has been included to show a cylindrical body 75 provided with reflective coatings 76 at its opposite ends, with one end having either a central window 77 or with the central portion or the entire end of the body provided with a partially transparent, reflective coating. The interior of the body portion 75 may be either gaseous or liquid as in FIGURE 1 and in FIGURES 6 and 7 or solid as in FIGURE 2.

The photon generator and emitter of FIGURE 5 is shown at 78 in the form of a sphere provided with a spherical reflecting coating 79 which may be coated either on the outside of a solid sphere of the luminescent material 41 or on the interior surface of a hollow globe 80 containing a liquid or gaseous system. A window which may be transparent or partially transparent and mainly reflective is provided through the reflective coating 79, and in the second case through the container 80.

While the systems of FIGURES 1 and 2 have been shown in connection with the transmission of intelligence in which the photon beam is pulse amplitude or frequency modulated, the emitted beam may be utilized for any purposes to which photon beams are adapted, particularly in the case of high energy beams to welding, cutting, boring, and in weaponry, as well as for communicating intelligence information. In some applications, the photon beam may be adequate when it is in incoherent form where the luminescent medium emits high energy photon beams without reaching a lasing condition. Where a lasing medium is sufficiently pumped by the nuclear radiation, lasing action occurs to produce a high intensity laser beam which can be utilized for any purposes for which standard laser beams are employed, the laser beam which is generated by nuclear radiation pumping according to the present invention giving a particularly high energy laser output.

A gas laser pumped by a cylindrical source of nuclear radiation is illustrated in FIGURE 6. This includes an L-shaped tubular enclosure 82 having one leg 83 and another leg 84, at the junction of which is mounted a metallic plane mirror 85 serving as a beam reflector or deflector for transferring the photon beam from one of the legs 83, 84 to the other. The mirror 85 is adjustable by the screws 86. The enclosure 82 may be, for example, of beryllium, aluminum, zirconium and alloys thereof. Within the leg 83 is mounted a sleeve 87 of beryllium, copper and alloys thereof, or similar materials, held at one end at an abutment 88 and at its other by a snap ring 89. The interior surface of the sleeve 87 is provided with a coating of solid radioactive material at 90 which may be any of the solid sources of nuclear radiation previously given, for example, a 5 to 20 micron thick layer of U-235 or PO-210, or other solid source of nuclear radiation, preferably for heavy particle emission including fission fragments.

At the free end of the leg 83 is mounted a metallic surface mirror 91 adjustable by screws 92. The reflecting surface of the mirror 91 may be planar, confocal, or hemispherical. At the free end of the leg 84 is mounted a partially transparent, mainly reflective mirror 93 adjustable by screws 94. The partially transparent mirror 93 may be of standard laser type, having a base of transparent material with a reflecting coating on its inner surface which is partially transparent to permit passage therethrough of photons having sufficient energy. The interior surface of the mirror 93 may also be either planar, confocal or hemispherical and the laser beam emitted therefrom is indicated by the arrows 95. The laser beam is reflected between the mirrors 91 and 93, being deflected in its path by the angular mirror 85, and emitting a portion of the photons through the mirror 93 with each pass.

Figure 7:
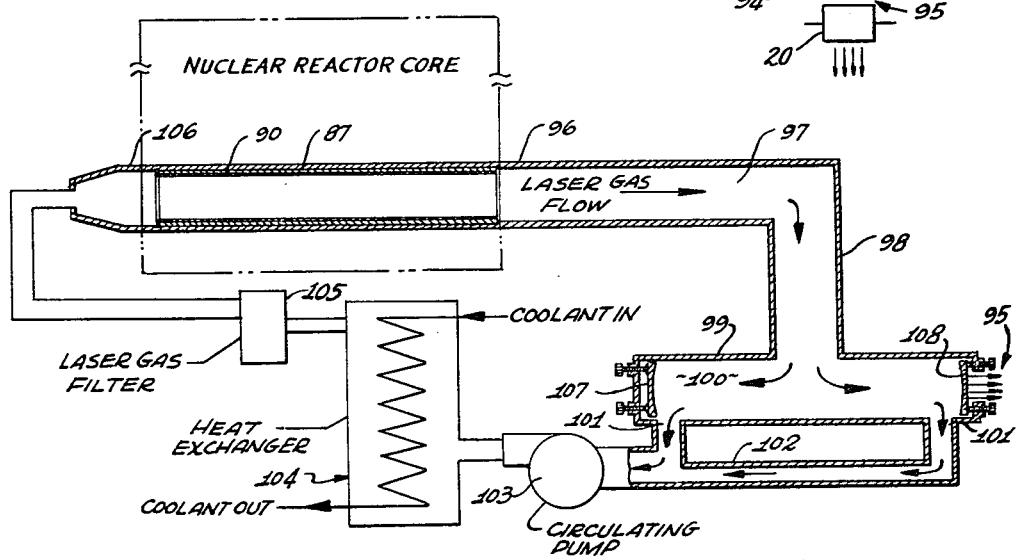
FIGURE 7 also is a schematic sectional view of a gas laser pumped by nuclear radiation in which the lasing action takes place in a cavity remote from the location of the pumping activity, with the laser gas circulating between the pumping cavity to the lasing cavity.

The photon generator and emitter of FIGURE 7 produces lasing action at a location remote from the location of the pumping action. A canister 96 provides a cavity 97, a portion of which is surrounded by a sleeve 87 with a coating 90 of radioactive material, the same as in FIGURE 6. The canister 96 is connected by a tube 98 to an enclosure 99 around a cavity 100 in which the lasing action takes place. Outlets 101 at the opposite ends of the cavity 100 are piped by 102 to a circulating pump 103 which passes the lasing gas through a heat exchanger 104 and a gas filter 105 to the back end 106 of the canister 96. The laser pumping action occurs within the sleeve 87 by absorption of the energy of the nuclear radiation from the coating 90. The pumped states or inversions in the laser gas endure through passage of the gas from the cavity 97 into the lasing cavity 100 where lasing action takes place with movement of photons between mirrors 107 and 108 at opposite ends of the lasing cavity.

The mirrors 107 and 108 may be planar, confocal, or hemispherical, as in FIGURE 6, and the mirror 108 is provided with a partially transparent, mainly reflective laser coating through which the photons which have acquired sufficient energy are emitted in standard gas laser action. The lasing gases in FIGURES 6 and 7 can be any of the examples previously given or any other gases having lasing capability and of being pumped or excited by nuclear radiation, particularly by heavy particles from the nucleus.

The nuclear radiation pumping canisters of both FIGURES 6 and 7 may be placed in the core of a nuclear reactor, as previously described, to become an integral part of the critical mass of the reactor and participate in the reactor's controlled chain reaction.

The nuclear-radiation-excited photon generator and emitter according to the present invention has relatively long life and high overall reliability. It gives efficient energy conversion and has favorable specific operating costs for photon beam utilization generally. Non-lasing emitters of incoherent beams of photon may be utilized where adequate but the invention finds its greatest utility where high intensity coherent beams are produced by laser action through nuclear radiation pumping of lasable materials. In the photon generator according to the present invention, nuclear radiation is substantially directly (macroscopically speaking) converted into photons without intermediate conversion steps, preferably with the use of high energy-deposition-density heavy particles emitted by the nucleus.

While certain preferred embodiments of the invention have been specifically illustrated and described it will be understood that the invention is not limited thereto as many variations will be apparent to those skilled in the art and the invention is to be given its broadest interpretation within the terms of the following claims.

I claim:

1. A photon generator and emitter comprising: a luminescent medium; a source of nuclear radiation associated with said luminescent medium so as to transfer energy directly thereto to create photons within said medium by direct excitation and deexcitation without intermediate conversion steps; means for reflecting said photons in at least one direction in said generator; and means for emitting a beam of said photons from the generator.

2. A photon generator and emitter as defined in claim 1 in which said luminescent medium is lasable and said reflecting means comprises a pair of mirrors between which said photons are reflected, one of said mirrors being partially transparent to emit a coherent beam of photons therethrough.

3. A photon generator and emitter as defined in claim 1 in which said source of nuclear radiation is a fissionable isotope and forms an integral part of the critical mass of a nuclear reactor, directly participating in the neutron chain reaction thereof.

4. A photon generator and emitter as defined in claim 1 in which said source of nuclear radiation is a particle-emitting radioisotope.

5. A photon generator and emitter as defined in claim 1 in which said luminescent medium is a luminescent gas and said source of nuclear radiation is a surface source surrounding said gas.

6. A photon generator and emitter as defined in claim 1 in which said luminescent medium is a solid and is in the form of layers or films placed between layers or films of said source of nuclear radiation which is also in a solid state, the result being a sandwich of alternate layers or films of luminescent and nuclear source material.

7. A photon generator and emitter as defined in claim 1, in which said luminescent medium and source of nuclear radiation are mixed together so as to be substantially homogeneous.

8. A photon generator and emitter as defined in claim 1 in which said luminescent medium and said source of nuclear radiation are identical in the form of a nuclear radiation source material which will itself be a luminescent medium in its undecayed or unfissioned state.

9. A photon generator and emitter as defined in claim 1 in which said luminescent medium is composed of a mixture of a host material and a luminescent material.

10. A photon generator and emitter as defined in claim 1 including means for modulating said beam of photons to transmit intelligence thereby as a communication link.

11. A photon generator and emitter as defined in claim 2 including means for modulating said beam of photons to transmit intelligence thereby as a communication link.

12. A photon generator and emitter as defined in claim 1 and including: condenser plates at opposite sides of said luminescent medium; a nicol prism at the photon beam exit; and means for impressing modulating intelligence upon said plates in the form of an electrical signal to effect modulation of the emitted photon beam to transmit intelligence thereby as a communication link.

13. A photon generator and emitter as defined in claim 1 including: a Kerr cell through which said photon beam passes; condenser plates at opposite sides of said Kerr cell; nicol prisms at opposite sides of said Kerr cell polarized at 45° to the axis of the condenser plates; and means for impressing intelligence information as an electric signal upon the condenser plates to modulate the passage of the photon beam through the Kerr cell and nicol prisms to transmit intelligence.

14. A photon generator and emitter as defined in claim 1 in which said luminescent medium is in the form of a bundle of thin solid fibers having reflecting surfaces at their opposite ends, said photon beam being emitted from a common end of said fibers through one of said reflecting surfaces.

15. A photon generator and emitter as defined in claim 1 in which said luminescent medium has a spherical reflecting surface thereabout in which there is provided a forward window through which the photon beam emerges.

16. A photon generator and emitter as defined in claim 1 including cooling means intimately associated with said luminescent medium and nuclear source of radiation for extracting heat therefrom and conveying it to a heat sink at the exterior of the generator.

17. A photon generator and emitter as defined in claim 1 including: a closed circuit through which a luminescent medium in the form of a lasable fluid may flow, said circuit including a nuclear pumping region containing the nuclear source of radiation, and a lasing region; means for causing flow of the luminescent medium through said circuit between said nuclear pumping region and said lasing region; and a pair of reflectors in said lasing region between which the generated photons are reflected, one of said reflectors being partially transparent to pass a laser beam therethrough.

18. A photon generator and emitter as defined in claim 1 including: a closed circuit through which a mixture of a fissionable isotope and a luminescent medium in the form of a fluid may flow, said circuit including a nuclear pumping region forming part of the critical mass of a nuclear reactor, and a lasing region some distance removed from the nuclear reactor core; means for causing flow of the fluid luminescent medium and fissionable isotope through said circuit between said nuclear pumping region and said lasing region; and a pair of reflectors in said lasing region between which the generated photons are reflected, one of said reflectors being partially transparent to pass a laser beam therethrough.

19. A photon generator and emitter as defined in claim 3 in which said luminescent medium is a lumuinescent gas; a container for said gas, said fissionable isotope constituting a liner for at least a portion of said container, at least said portion being associated with the core of the nuclear reactor.

20. A photon generator and emitter as defined in claim 3 in which said luminescent medium is a luminescent gas; a container for said gas; reflecting means adjacent opposite ends of said container, one of said reflecting means having the characteristic of emitting a beam of photons therethrough, said fissionable isotope constituting a liner for at least a portion of said container, at least said portion being associated with the core of the nuclear reactor.

References Cited
UNITED STATES PATENTS

| | | |
|---|---|---|
| 2,385,086 | 9/1945 | D'Agostino et al. |
| 2,929,922 | 3/1960 | Schawlow et al. _____ 250—199 |
| 3,126,485 | 3/1964 | Ashkin et al. _____ 250—199 |
| 3,130,254 | 4/1964 | Sorokin et al. _____ 250—199 |
| 3,149,290 | 9/1964 | Bennett et al. |
| 3,202,934 | 8/1965 | Coffee _____ 250—199 |
| 3,215,038 | 11/1965 | Heller et al. _____ 250—199 |
| 3,233,107 | 2/1966 | Senett _____ 250—199 |

ROBERT L. GRIFFIN, *Primary Examiner.*

JOHN W. CALDWELL, DAVID G. REDINBAUGH, *Examiners.*

A. MAYER, *Assistant Examiner.*